(12) United States Patent
Ivanova et al.

(10) Patent No.: US 9,378,079 B2
(45) Date of Patent: Jun. 28, 2016

(54) DETECTION OF ANOMALIES IN ERROR SIGNALS OF CLOUD BASED SERVICE

(71) Applicant: Microsoft Corporation, Redmond, WA (US)

(72) Inventors: Olga Ivanova, Redmond, WA (US); Smita Ojha, Seattle, WA (US); Alexandre de Baynast, Aachen (DE); Markus Cozowicz, Salzburg (AT); Ulrich Pinsdorf, Aachen (DE); Yi Wang, Redmond, WA (US); Philipp Kranen, Aachen (DE); Venkat Narayanan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 123 days.

(21) Appl. No.: 14/475,550

(22) Filed: Sep. 2, 2014

(65) Prior Publication Data

US 2016/0062815 A1    Mar. 3, 2016

(51) Int. Cl.
*G06F 11/00* (2006.01)
*G06F 11/07* (2006.01)
*G06F 11/30* (2006.01)
*G06N 99/00* (2010.01)

(52) U.S. Cl.
CPC ........ *G06F 11/0751* (2013.01); *G06F 11/0709* (2013.01); *G06F 11/3072* (2013.01); *G06N 99/005* (2013.01)

(58) Field of Classification Search
CPC .................................................. G06F 11/0751
USPC .................................... 714/26, 27, 28, 25, 4.1
See application file for complete search history.

(56) References Cited

U.S. PATENT DOCUMENTS

| 7,225,343 | B1 | 5/2007 | Honig et al. |
|---|---|---|---|
| 7,885,915 | B2 | 2/2011 | Parson et al. |
| 8,108,929 | B2 | 1/2012 | Agrawal et al. |
| 2013/0198119 | A1 | 8/2013 | Eberhardt, III et al. |
| 2013/0262914 | A1* | 10/2013 | Mao ..................... G06F 11/0709 714/4.2 |
| 2014/0040174 | A1* | 2/2014 | Leung .................. G06N 99/005 706/12 |
| 2014/0082730 | A1 | 3/2014 | Vashist et al. |
| 2014/0149806 | A1 | 5/2014 | Khalastchi et al. |
| 2014/0279779 | A1* | 9/2014 | Zou .......................... G06N 3/08 706/25 |

OTHER PUBLICATIONS

Harris, Derrick., "Numenta, Jeff Hawkins' Ai Startup, Is Now Only About Learning Your Aws Patterns", Published on: Mar. 25, 2014 Available at: http://www.da6nci.com/tag/deep-learning/.

(Continued)

*Primary Examiner* — Dieu-Minh Le
(74) *Attorney, Agent, or Firm* — Tom Wong; Jim Ross; Micky Minhas

(57) ABSTRACT

Anomalies detection in error signals of a cloud based service is provided. An application such as an analysis application identifies a machine learning algorithm that matches error signals of components of a cloud based service. A periodic pattern from the error signals is removed with the machine learning algorithm to filter the periodic pattern from an error count in the error signals. The error signals are processed with the machine learning algorithm to detect one or more anomalies with the components. The machine learning algorithm is updated while processing new data to detect new patterns.

20 Claims, 7 Drawing Sheets

(56) References Cited

OTHER PUBLICATIONS

Jonsson, Leif., "Increasing Anomaly Handling Efficiency in Large Organizations Using Applied Machine Learning", In Proceedings of the 2013 International Conference on Software Engineering, May 18, 2013, pp. 1361-1364.

Deorio, et al., "Machine Learning-based Anomaly Detection for Post-silicon Bug Diagnosis", In Proceedings of the Conference on Design, Automation and Test in Europe, Mar. 18, 2013, 6 pages.

* cited by examiner

DETECTION OF ANOMALIES IN ERROR SIGNALS OF CLOUD BASED SERVICE

BACKGROUND

Distributed computing technologies have enabled multiple computing resources to provide coordinated and distinct solutions. An example of distributed computing, cloud computing brings together multiple systems to provide solutions to user needs. Cloud computing can span a vast array of computing resources. The computing resources utilized in cloud computing applications and services are dispersed across networks and locations. Dispersed computing resources are remotely controlled and managed. Usually, manual solutions provide installation and configuration support to cloud computing assets. Manual installation solutions by human components of widely dispersed computing resources are not cost effective.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing detection of anomalies in error signals of a cloud based service. In some example embodiments, an analysis application of the cloud based service may identify a machine learning algorithm that matches error signals of components of the cloud based service. The machine learning algorithm may be selected from machine learning algorithm candidates that are processed with historical training data that includes previously detected service issues. A periodic pattern may be removed from the error signals with the machine learning algorithm to filter the periodic pattern from an error count in the error signals. The error signals may be processed with the machine learning algorithm to detect one or more anomalies with the components. The machine learning algorithm may also be updated while processing new data to detect new patterns in a new stream of error signals.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
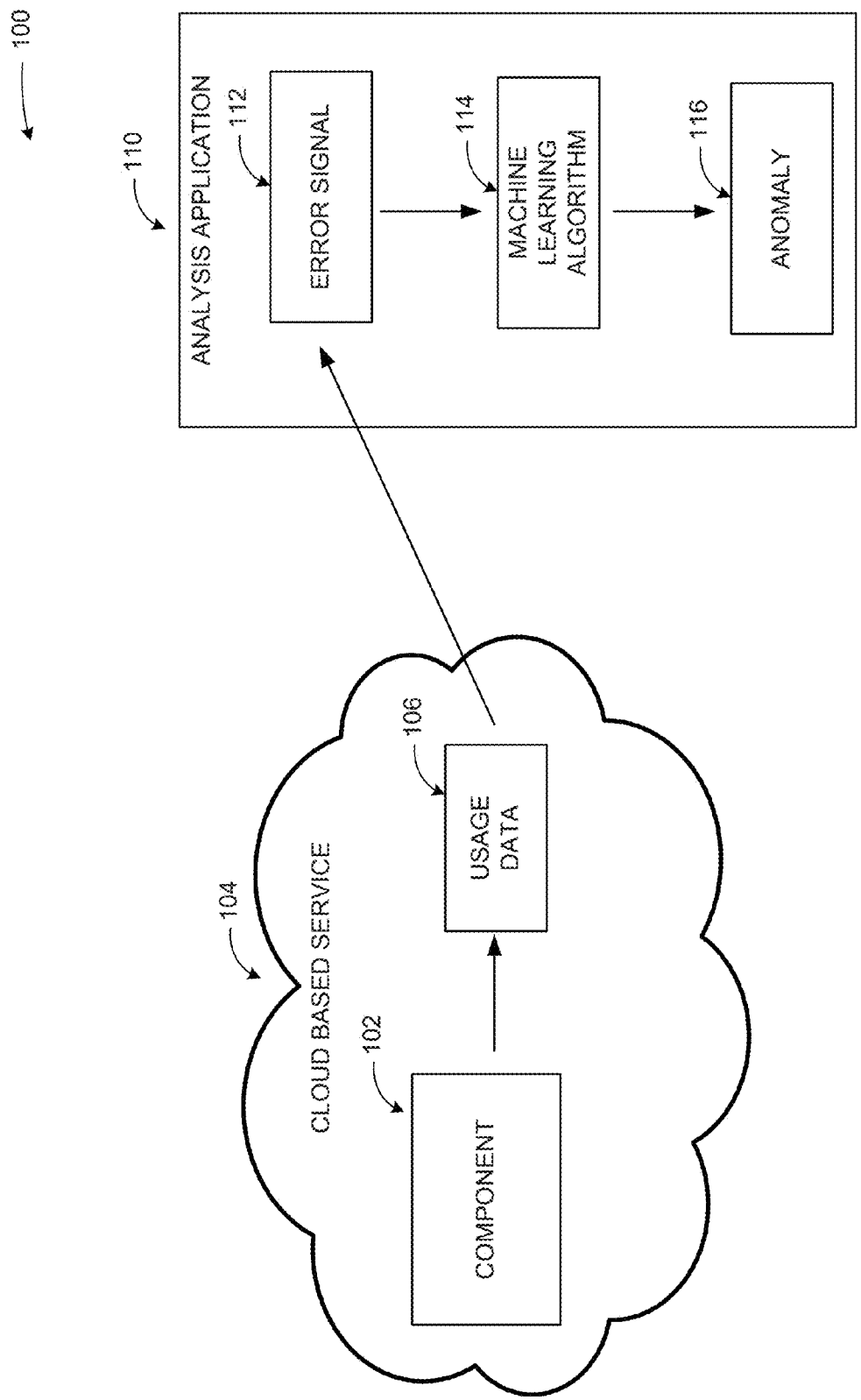
FIG. 1 is a conceptual diagram illustrating an example of anomalies detection in error signals of a cloud based service, according to embodiments.

As briefly described above, detection of anomalies in error signals of a cloud based service may be provided by an analysis application. A machine learning algorithm (MLA) that matches error signals of components of a cloud based service may be identified. A periodic pattern may be removed from the error signals with the machine learning algorithm to filter the periodic pattern from an error count in the error signals. The error signals may be processed with the MLA to detect one or more anomalies with the components. The MLA may be updated while processing new data to detect new patterns.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide anomalies detection in error signals of a cloud based service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example of anomalies detection in error signals of a cloud based service, according to embodiments.

In a diagram 100, a cloud based service 104 may provide one or more services. The cloud based service 104 may provide an expansive variety of services. The services may include document sharing, e-mail services, storage services, among others. The cloud based service 104 may also be a distributed application that provides services through one or more computing devices that execute one or more components of the distributed application. The one or more computing devices may be connected through one or more networks that use wired or wireless infrastructure.

An example of the cloud based service 104 may include an e-mail service. The e-mail service may be hosted in multiple computing devices. The e-mail service may be divided between the computing devices based on an available processing capacity of each computing device. In another example scenario, the cloud based service 104 may include a document sharing service. The document sharing service may distribute stored documents across multiple computing devices based on available storage capacity of each computing device. The examples of the cloud based service 104 as an e-mail service and a document sharing service were not provided in a limiting sense. The cloud based service 104 may include any distributed computation solution that provides a service to one or more customers. A customer of the cloud based service may include a person, an organization, or another computing device authorized to interact with the cloud based service One or more interactions of the customer with the cloud based service 104 may be monitored and stored within a usage data 106. The usage data 106 may also be referred to as passive data. The usage data 106 may include measurements of customer actions on the cloud based service 104. An example of the usage data 106 may include measurements captured when the customer initiates a client interface of an e-mail service through actions such as authentication actions and reads one or more e-mails associated with a user account of the customer. Another example of the usage data 106 may include measurements captured when the customer initiates an editing client interface of a document sharing service to edit the document. The usage data 106 may also include measurements captured when the customer edits the document and saves the document. The usage data 106 may be anonymized prior to processing by removing private data. An example of private data may include customer identification data such as an identity of the customer, a location of the customer, among others.

An analysis application 110 may receive or retrieve the usage data 106 to generate an error signal 112. Multiple error signals may also be generated from one or more usage data. The usage data may also be collected from other sources such as client devices of the cloud based service 104 that capture measurements of customer actions on the cloud based service 104.

The analysis application 110 may be a stand-alone application that is located locally or remotely to the cloud based service 104. Alternatively, the analysis application 110 may be a component of the cloud based service 104. The analysis application 110 may generate an error signal 112 from the usage data 106. The error signal 112 may include information associated with a component 102 of the cloud based service 104 that may generate the errors. The error signal 112 may include information associated with the errors such as an identification of the error, a time of the error, a duration of the error, a source of the error, among others. The component 102 may include a hardware component such as a computing device of the cloud based service.

The error signal 112 may be processed through an MLA 114. The MLA 114 may detect an anomaly 116 with the component 102. The anomaly 116 may include a measurement that is outside an expected range. An example may include a response time to a customer action. The component 102 may be expected to respond to a customer action with a response time within a range such as 1 to 5 milliseconds. The anomaly 116 may be detected by the MLA 114 if the error signal 112 includes a response time such as 6 milliseconds that is outside the range such as 1 to 5 milliseconds.

While the example system in FIG. 1 has been described with specific components including the cloud based service 104, the component 102, the MLA 114, and the anomaly 116, embodiments are not limited to these components or system configurations and can be implemented with other system configuration employing fewer or additional components.

Figure 2:
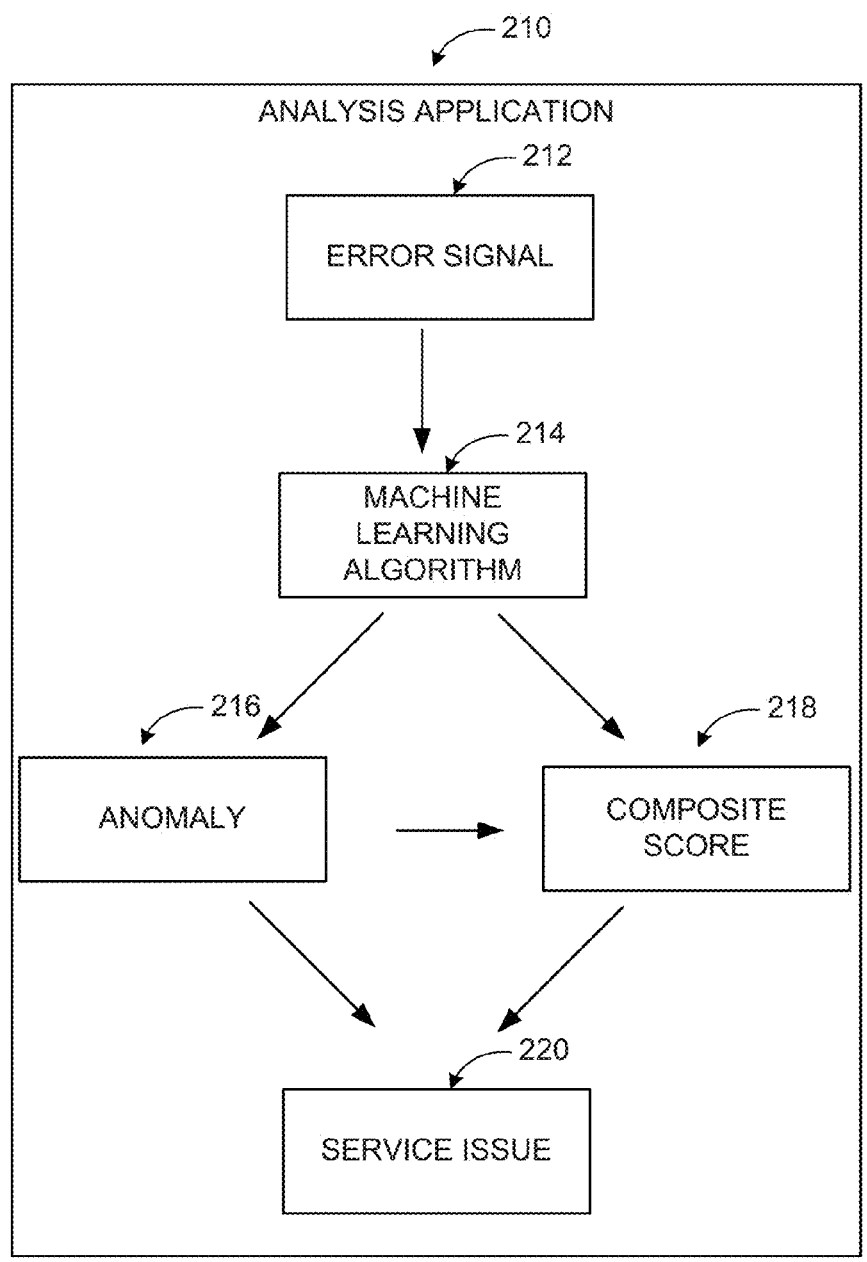
FIG. 2 illustrates components of a scheme to detect anomalies in error signals of a cloud based service, according to embodiments.

FIG. 2 illustrates components of a scheme to detect anomalies in errors signals of a cloud based service, according to embodiments.

In a diagram 200, a scheme to detect an anomaly 216 in an error signal 212 of a cloud based service may be described. An analysis application 210 may collect the error signal 212 and other error signals from a variety sources such as computing devices of the cloud based service. The sources may capture usage data of measurement of customer actions on the cloud based service. The usage data may be parsed to generate the error signal 212 which may include information associated with errors generated by components of the cloud based service.

The error signal 212 may be processed through a MLA 214. The MLA 214 may be selected from MLA candidates by processing a training data through the MLA candidates. The training data may include error signals captured through an extended period of time such as months or years. The training data may include historical data with previously detected service issues. The previously detected service issues may be compared to output of the MLA candidates. The MLA candidates may be ordered based on a number of matches between the previously detected service issues and the output. A top candidate from the ordered MLA candidates may be selected as the MLA 214. The top candidate may have the highest number of matches between the previously detected service issues and the output.

The error signal 212 may be processed by the MLA 214 to detect the anomaly 216. The anomaly 216 may be further processed to generate a composite score 218 that provides a value for a probability of the anomaly 216 to cause a service issue 220. The service issue 220 may include an outage or a regression of one or more components of the cloud based service. Other anomalies detected from the error signal 212 may also be added to the composite score 218. The composite score 218 may be compared to a service issue threshold to determine the service issue 220. The service issue threshold may be configurable by a stakeholder that includes an authorized user of the analysis application 210, an administrator of the cloud based service, a customer impacted by the service issue 220, among others. The service issue threshold may be increased to increase a sensitivity of the analysis application 210 to detect the service issue 220. The service issue threshold may be decreased to decrease a sensitivity of the analysis application 210 to detect the service issue 220.

Alternatively, a service issue 220 may also be detected from the anomaly 216. The anomaly 216 may be compared to a historical data that matches anomalies to service issues. The MLA 214 may process the anomaly 216 through the historical data to match the anomaly 216 to the service issue 220. The MLA may also compute a composite score 218 for the anomaly 216 that is matched to the service issue 220. The composite score 218 may be used for reporting the service issue 220, the anomaly 216, among other things.

Figure 3:
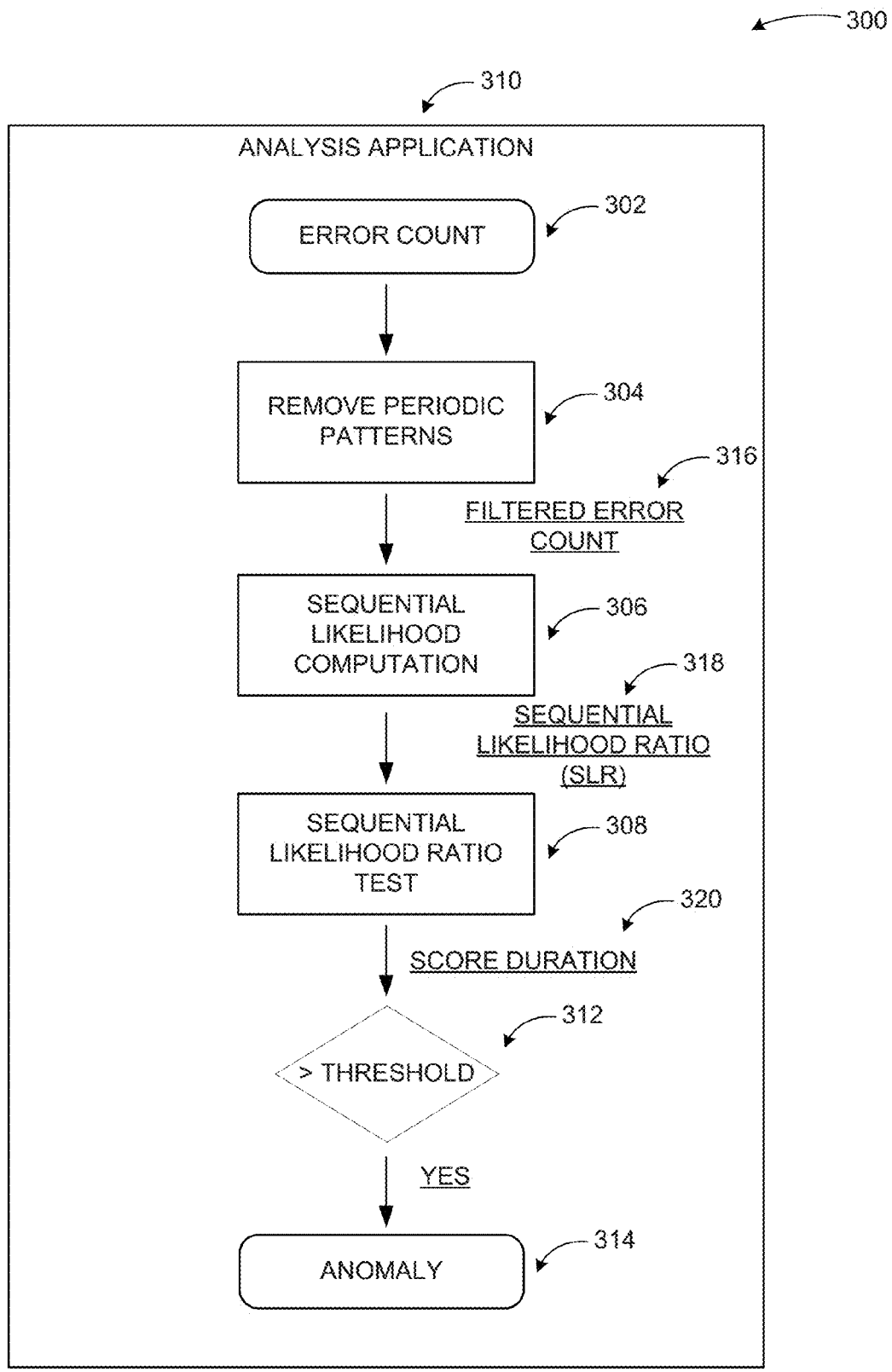
FIG. 3 illustrates detailed view of a scheme to detect anomalies in error signals of a cloud based service, according to embodiments.

FIG. 3 illustrates additional components of a scheme to detect anomalies in error signals of a cloud based service, according to embodiments.

In a diagram 300, an analysis application 310 may compute an error count 302. The error count 302 may be computed by counting a number of errors generated by the components of the cloud based service. The error count 302 may be a distribution of the number of errors across a time range. The error count 302 may be provided as a histogram of the number of errors across the time range presented as data points in chunks of the time range.

The errors generated by components of the cloud based service and information about the errors may be stored in the error signals of the cloud based service processed by the analysis application 310. The analysis application 310 may execute an operation to remove periodic patterns 304 from the error signals to filter one or more periodic patterns from the error count in the error signals. A number of errors that are associated with the periodic patterns may be subtracted from the error count. The periodic patterns from the error signals may be flattened during the filtering. The periodic patterns may include an hourly pattern, a daily pattern, a weekly pattern, a monthly pattern, a custom time period based pattern, among others.

A filtered error count 316 that results from an operation to remove the periodic patterns 304 may be processed through an operation that includes a sequential likelihood computation (306). The sequential likelihood computation 306 may generate a sequential likelihood ratio (SLR) 318 of the error signals. The SLR 318 may describe a likelihood of the error signals to include an anomaly 314.

The SLR 318 may be processed through an operation that includes an SLR test 308. The SLR 308 test may generate a score duration 320 associated with the error signals. The score duration 320 may be compared to a threshold 312 to detect the anomaly 314. The anomaly 314 may be detected in response to a detection that the score duration 320 exceeds the threshold 312. The threshold 312 may be configured by a stakeholder to adjust a sensitivity of detecting the anomaly 314.

Figure 4:
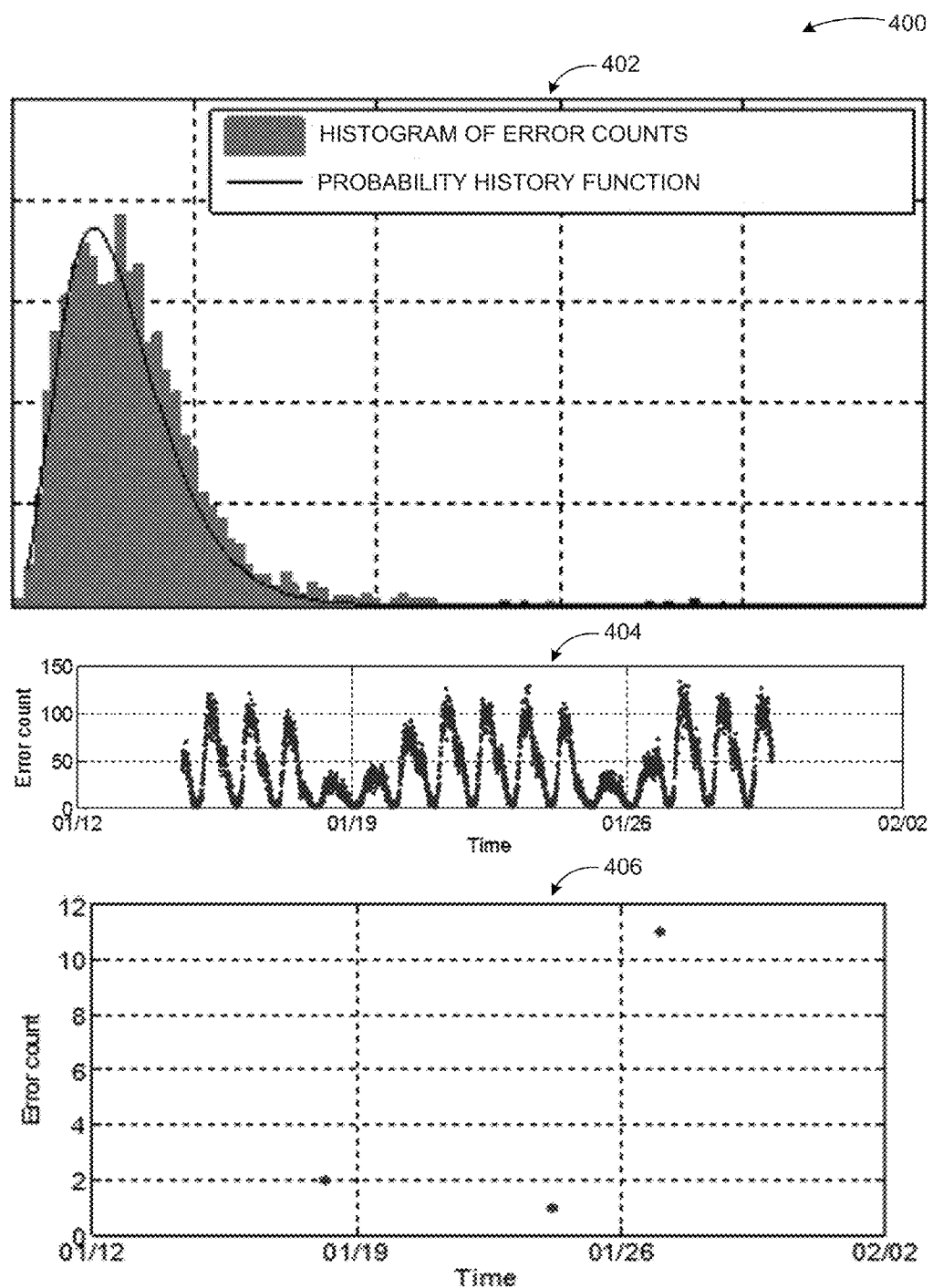
FIG. 4 illustrates another example of detecting patterns of anomalies in error signals of a cloud based service, according to embodiments.

FIG. 4 illustrates another example of a scheme to detect anomalies in error signals of a cloud based service, according to embodiments.

In a diagram 400, charts of patterns of error counts may be illustrated. Each chart may have an error count as a y-axis label and a time as an x-axis label. A chart 402 may illustrate a non-periodic pattern of error counts. A data point in the histogram may illustrate a number of errors within a time range such as a day. A probability history function may be drawn to show a progress of the errors generated by the components of the cloud based service across a time period. A selected MLA may process the error signals illustrated by the chart 402 to detect anomalies. Anomalies may include data points of the error signals that exceed a threshold. The threshold may be set based on an expected value such a value of the probability history function at the time point of the data point.

Detected anomalies may be combined to generate a composite score. An "OR" operation may be applied to each anomaly to detect probability values of the anomalies to cause a service issue of the components of the cloud based service. The probability values may be added to generate the composite score. The composite score may be compared against a service issue threshold which may be configurable by a stakeholder. The service issue of the components of the cloud based service may be detected in response to the composite score exceeding the service issue threshold.

A chart 404 may be an example of periodic pattern in error signals of the cloud based service. The analysis application may filter out periodic patterns from the error count of the chart 404 to flatten the error signals as described previously. Remaining error count may be used to detect anomalies associated with components of the cloud based service.

A chart 406 may be an example of sparse errors based pattern in error signals of the cloud based service. The analysis application may process the error signals of the chart 406 to detect anomalies in the error signals. A service issue analysis may be done by generating a composite score from the anomalies and comparing the composite score to a service issue threshold that is configurable.

In addition, new data that includes one or more error signals may be processed through the learning algorithm to detect new anomalies. One or more attributes of the MLA may be adjusted to improve a detection of the new anomalies while processing the new data. The attributes may also be adjusted post processing of the new data upon detection of anomalies that are not detected by the MLA.

The technical effect of detection of anomalies in error signals of a cloud based service may be enhancements in failure detection and analysis to encompass a distributed system and components of the distributed system compared to individual component based solutions.

The example scenarios and schemas in FIG. 1 through 4 are shown with specific components, data types, and configurations. Embodiments are not limited to systems according to these example configurations. Providing anomalies detection in error signals a cloud based service may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
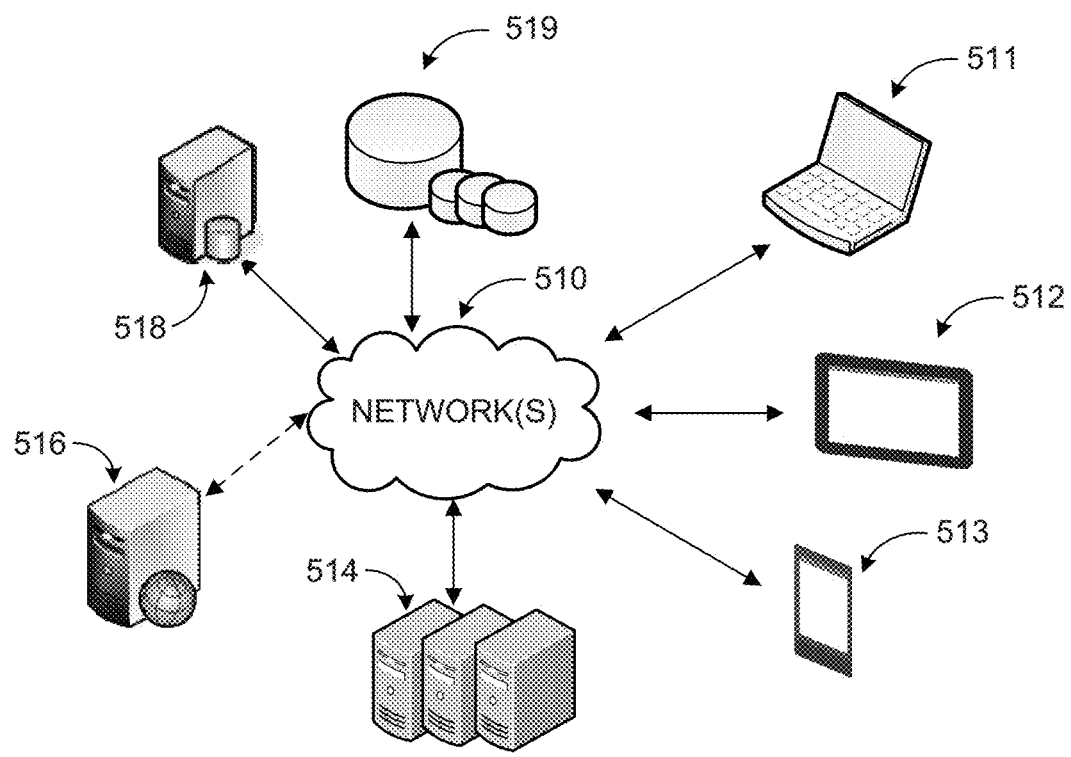
FIG. 5 is a simplified networked environment, where a system according to embodiments may be implemented.

FIG. 5 is an example networked environment, where embodiments may be implemented. An analysis application configured to provide anomalies detection in error signals of a cloud based service may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An analysis application may detect anomalies as a result of analysis of error count and patterns in error signals of a cloud based service. A service issue may be detected based on analysis of a composite score of the anomalies. The analysis application may store data associated with the error signals and anomalies in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide anomalies detection in error signals of a cloud based service. Furthermore, the networked environments discussed in FIG. 5 are for illustration purposes only. Embodiments are not limited to the example applications, modules, or processes.

Figure 6:
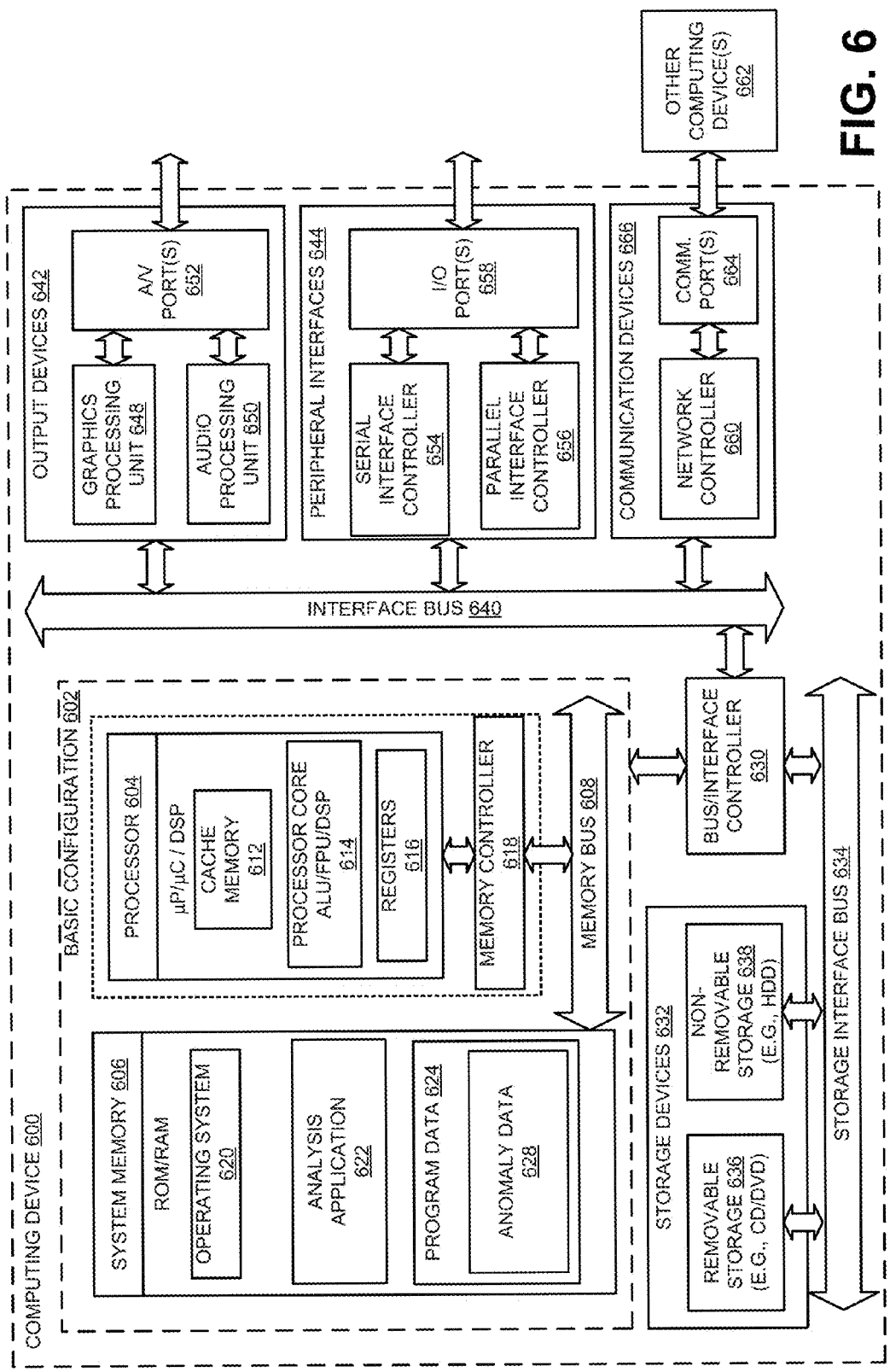
FIG. 6 illustrates a general purpose computing device, which may be configured to provide anomalies detection in error signals of a cloud based service.

FIG. 6 illustrates a general purpose computing device, which may be configured to provide anomalies detection in error signals of a cloud based service, arranged in accordance with at least some embodiments described herein.

For example, the computing device 600 may be used to provide anomalies detection in error signals of a cloud based service. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (μP), a microcontroller (μC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604. The processor 604 may include an analytics processor. The analytics processor may be custom constructed to execute an MLA. The analytics processor may include components optimized to execute instructions of the MLA.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, an analysis application 622, and a program data 624. The analysis application 622 may detect anomalies in error signals of a cloud based service. An error count of the error signals may be processed through an MLA to detect the anomalies. The anomalies may be analyzed by the MLA using a composite score to detect a service issue of components of the cloud based service. The program data 624 may include, among other data, an anomaly data 628, or the like, as described herein. The anomaly data 628 may include information associated error signals, error count, composite score, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include anomalies detection in error signals of a cloud based service. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
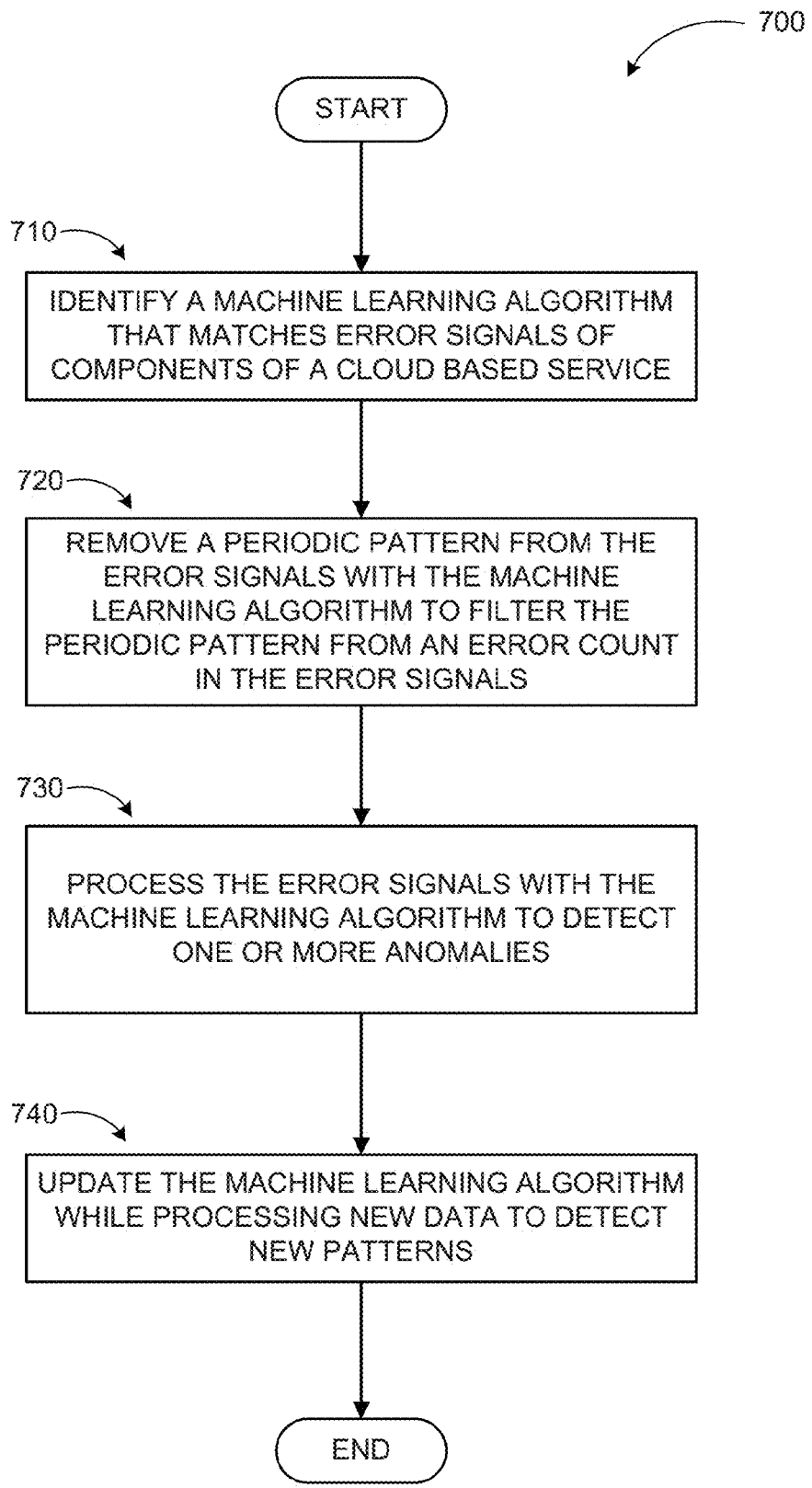
FIG. 7 illustrates a logic flow diagram for a process to provide anomalies detection in error signals of a cloud based service, according to embodiments.

FIG. 7 illustrates a logic flow diagram for a process to provide anomalies detection in error signals of a cloud based service, according to embodiments. Process 700 may be implemented on an analysis application of the cloud based service.

Process 700 begins with operation 710, where a machine learning algorithm that matches error signals of components of a cloud based service may be identified. At operation 720, a periodic pattern may be removed from the error signals with the machine learning algorithm to filter the periodic pattern from an error count in the error signals. At operation 730, the error signals may be processed with the machine learning algorithm to detect one or more anomalies with the components. The machine learning algorithm may be updated while processing new data to detect new patterns at operation 740.

The operations included in process 700 are for illustration purposes. An analysis application according to embodiments may be implemented by similar processes with fewer or additional steps, as well as in different order of operations using the principles described herein.

According to some examples, a method that is executed on a computing device to provide detection of anomalies in error signals of a cloud based service may be described. The method may include identifying a machine learning algorithm that matches error signals of components of a cloud based service, removing a periodic pattern from the error signals with the machine learning algorithm to filter the periodic pattern from an error count in the error signals, processing the error signals with the machine learning algorithm to detect one or more anomalies with the components, and updating the machine learning algorithm while processing new data to detect new patterns.

According to other examples, the method may further include computing an error count in the error signals, where the error count is a number of errors generated by the components of the cloud based service. The periodic pattern may be flattened from the error signals that includes one or more from a set of a daily pattern and a weekly pattern. The periodic pattern may be flattened from the error signals that includes a custom time period based pattern. The filtered error count may be processed with a sequential likelihood computation to generate a sequential likelihood ratio (SLR) of the error signals. A sequential likelihood ratio (SLR) may be processed with an SLR test to generate a score duration associated with the error signals, wherein the SLR is generated by processing the filtered error count with a sequential likelihood computation. The score duration may be compared to a threshold and in response to a detection that the score duration exceeds the threshold, the one or more anomalies associated with the error signals may be detected.

According to further examples, the method may further include processing a subset of the error signals that includes training data through one or more machine learning algorithm candidates. The training data that includes previously detected service issues may be used. Previously detected service issues in the training data may be compared to output of the machine learning algorithm candidates. The machine learning algorithm candidates may be ordered based on a number of matches between the previously detected service issues and the output. One of the machine learning algorithm candidates at a top of the ordered machine learning algorithm candidates that has a highest number of the matches between the previously detected service issues and the output may be selected as the machine learning algorithm.

According to some examples, a computing device to detection of anomalies in error signals of a cloud based service may be described. The computing device may include a memory, a processor coupled to the memory. The processor may be configured to execute an analysis application in conjunction with instructions stored in the memory. The analysis application may be configured to identify a machine learning algorithm that matches error signals of components of a cloud based service by analyzing training data that includes historical data with previously detected service issues, remove a periodic pattern from the error signals with the machine learning algorithm to filter the periodic pattern from an error count in the error signals, where the error count is computed as a number of errors generated by the components of the cloud based service, process the error signals with the machine learning algorithm to detect one or more anomalies with the components, and update the machine learning algorithm while processing new data to detect new patterns.

According to other examples, the analysis application is further configured to combine the one or more anomalies to generate a composite score. An "OR" operation may be applied to each one or the one or more anomalies to detect probability values of the anomalies to cause a service issue of the components of the cloud based service and the probability values may be added to generate the composite score. The composite score may be compared against a service issue threshold and the service issue of the components of the cloud based service may be detected in response to the composite score exceeding the service issue threshold. A stakeholder may be allowed to adjust the service issue threshold to configure a sensitivity of detecting the service issue, where the stakeholder includes an authorized user of the analysis application, and an administrator of the cloud based service. The new data that includes one or more new error signals may be processed through machine learning algorithm to detect new anomalies and one or more attributes of the machine learning algorithm may be adjusted to improve a detection of the new anomalies.

According to some examples, a computer-readable memory device with instructions stored thereon to provide detection of anomalies in error signals of a cloud based service may be described. The instructions may include actions that are similar to the method described above.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide detection of anomalies in error signals of a cloud based service, the method comprising:
identifying a machine learning algorithm that matches error signals of components of a cloud based service;
removing a periodic pattern from the error signals with the machine learning algorithm to filter the periodic pattern from an error count in the error signals;
processing the error signals with the machine learning algorithm to detect one or more anomalies with the components; and
updating the machine learning algorithm while processing new data to detect new patterns.

2. The method of claim 1, further comprising:
computing an error count in the error signals, wherein the error count is a number of errors generated by the components of the cloud based service.

3. The method of claim 1, further comprising:
flattening the periodic pattern from the error signals that includes one or more from a set of a daily pattern and a weekly pattern.

4. The method of claim 1, further comprising:
flattening the periodic pattern from the error signals that includes a custom time period based pattern.

5. The method of claim 1, further comprising:
processing the filtered error count with a sequential likelihood computation to generate a sequential likelihood ratio (SLR) of the error signals.

6. The method of claim 1, further comprising:
processing a sequential likelihood ratio (SLR) with an SLR test to generate a score duration associated with the error signals, wherein the SLR is generated by processing the filtered error count with a sequential likelihood computation.

7. The method of claim 6, further comprising:
comparing the score duration to a threshold; and
in response to a detection that the score duration exceeds the threshold, detecting the one or more anomalies associated with the error signals.

8. The method of claim 1, further comprising:
processing a subset of the error signals that includes training data through one or more machine learning algorithm candidates.

9. The method of claim 8, further comprising:
using the training data that includes previously detected service issues.

10. The method of claim 8, further comprising:
comparing previously detected service issues in the training data to output of the machine learning algorithm candidates.

11. The method of claim 10, further comprising:
ordering the machine learning algorithm candidates based on a number of matches between the previously detected service issues and the output; and
selecting one of the machine learning algorithm candidates at a top of the ordered machine learning algorithm candidates that has a highest number of the matches between the previously detected service issues and the output, as the machine learning algorithm.

12. A computing device to provide detection of anomalies in error signals of a cloud based service, the computing device comprising:
a memory;
a processor coupled to the memory, the processor executing an analysis application in conjunction with instructions stored in the memory, wherein the analysis application is configured to:
identify a machine learning algorithm that matches error signals of components of a cloud based service by analyzing training data that includes historical data with previously detected service issues;
remove a periodic pattern from the error signals with the machine learning algorithm to filter the periodic pattern from an error count in the error signals, wherein the error count is computed as a number of errors generated by the components of the cloud based service;
process the error signals with the machine learning algorithm to detect one or more anomalies with the components; and
update the machine learning algorithm while processing new data to detect new patterns.

13. The computing device of claim 12, wherein the analysis application is further configured to:
combine the one or more anomalies to generate a composite score.

14. The computing device of claim 13, wherein the analysis application is further configured to:
apply an "OR" operation to each one or the one or more anomalies to detect probability values of the anomalies to cause a service issue of the components of the cloud based service; and
add the probability values to generate the composite score.

15. The computing device of claim 13, wherein the analysis application is further configured to:
compare the composite score against a service issue threshold; and
detect the service issue of the components of the cloud based service in response to the composite score exceeding the service issue threshold.

16. The computing device of claim 15, wherein the analysis application is further configured to:
allow a stakeholder to adjust the service issue threshold to configure a sensitivity of detecting the service issue, wherein the stakeholder includes an authorized user of the analysis application and an administrator of the cloud based service.

17. The computing device of claim 12, wherein the analysis application is further configured to:
process the new data that includes one or more new error signals through machine learning algorithm to detect new anomalies; and
adjust one or more attributes of the machine learning algorithm to improve a detection of the new anomalies.

18. A computer-readable memory device with instructions stored thereon to provide detection of anomalies in error signals of a cloud based service, the instructions comprising:
identifying a machine learning algorithm that matches error signals of components of a cloud based service by analyzing training data that includes historical data with previously detected service issues through machine learning algorithm candidates to select one of the machine learning algorithm candidates as the machine learning algorithm;
removing a periodic pattern from the error signals with the machine learning algorithm to filter the periodic pattern from an error count in the error signals, wherein the error count is computed as a number of errors generated by the components of the cloud based service;

processing the error signals with the machine learning algorithm to detect one or more anomalies with the components; and updating the machine learning algorithm while processing new data to detect new patterns.

19. The computer-readable memory device of claim 18, wherein the instructions further comprise:

comparing the previously detected service issues with output of the machine learning algorithm candidates;

ordering the machine learning algorithm candidates based on a number of matches between the previously detected service issues and the output; and selecting one of the machine learning algorithm candidates at a top of the ordered machine learning algorithm candidates that has a highest number of the matches between the previously detected service issues and the output, as the machine learning algorithm.

20. The computer-readable memory device of claim 18, wherein the instructions further comprise:

combining the one or more anomalies to generate a composite score;

comparing the composite score against a service issue threshold; and detecting the service issue of the components of the cloud based service in response to the composite score exceeding the service issue threshold.

* * * * *